United States Patent
Sone et al.

(10) Patent No.: US 9,407,730 B2
(45) Date of Patent: Aug. 2, 2016

(54) RELAY APPARATUS, RELAY CONTROL METHOD, AND RECORDING MEDIUM HAVING RELAY CONTROL PROGRAM RECORDED THEREIN

(71) Applicant: FUJITSU LIMITED, Kawasaki-shi, Kanagawa (JP)

(72) Inventors: Tomoyuki Sone, Yokohama (JP); Kei Hamada, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/224,802

(22) Filed: Mar. 25, 2014

(65) Prior Publication Data
US 2015/0172424 A1    Jun. 18, 2015

(30) Foreign Application Priority Data

Dec. 12, 2013    (JP) .................................. 2013-257348

(51) Int. Cl.
| | |
|---|---|
| *H04L 29/02* | (2006.01) |
| *H04L 29/06* | (2006.01) |
| *H04L 12/863* | (2013.01) |
| *H04L 12/46* | (2006.01) |
| *H04W 4/00* | (2009.01) |

(52) U.S. Cl.
CPC ............ *H04L 69/08* (2013.01); *H04L 12/4625* (2013.01); *H04L 47/50* (2013.01); *H04L 69/18* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 6,798,785 B1 * | 9/2004 | Sasson et al. | 370/466 |
| 6,891,838 B1 * | 5/2005 | Petite et al. | 370/401 |
| 2002/0198990 A1 * | 12/2002 | Bradfield et al. | 709/224 |
| 2007/0019656 A1 * | 1/2007 | Martin et al. | 370/401 |
| 2008/0147854 A1 * | 6/2008 | Van Datta et al. | 709/224 |
| 2013/0117460 A1 * | 5/2013 | Hsu et al. | 709/228 |
| 2015/0067188 A1 * | 3/2015 | Chakhaiyar | 709/232 |

FOREIGN PATENT DOCUMENTS

| | | |
|---|---|---|
| EP | 2154846 | 2/2010 |
| JP | 11-225154 | 8/1999 |
| WO | 99/14958 | 3/1999 |

OTHER PUBLICATIONS

Extended European Search Report dated Oct. 20, 2014 in corresponding European Patent Application No. 14183707.0.
Office Action dated Aug. 4, 2015 in corresponding European Patent Application No. 14183707.0.

* cited by examiner

*Primary Examiner* — Chi H Pham
*Assistant Examiner* — Shick Hom
(74) *Attorney, Agent, or Firm* — Staas & Halsey LLP

(57) ABSTRACT

A relay apparatus includes a reception processor configured to receive data corresponding to any one of plural types of communication protocols from a first network, analyze the structure of the received data, and convert information commonly included in the data of the communication protocol into common data of a predetermined format, a transmission processor configured to transmit data corresponding to any one of the plural types of communication protocols to a second network, and a relay controller configured to control the communication protocol and destination of the received data to be transmitted from the transmission processor to the second network, based on the common data and a relay rule which is defined for the common data.

9 Claims, 13 Drawing Sheets

FIG. 7

COMMON DATA (META DATA)

| DATA NAME | | DESCRIPTION |
|---|---|---|
| DESTINATION ID | | ABSTRACTED ID OF DESTINATION INFORMATION (DESTINATION ID HAS NO VALUE (e.g. 0) UNTIL DESTINATION IS DETERMINED) |
| TRANSMISSION SOURCE ID | | ABSTRACTED ID OF TRANSMISSION SOURCE INFORMATION |
| DATA TYPE | | DATA TYPE (FOR EXAMPLE, DEVICE REGISTRATION OR OPERATION LOG) |
| PROTOCOL TYPE | | FOR EXAMPLE, FTP OR HTTP |
| DATA SIZE | | SIZE OF DATA BODY |
| DATA BODY STORAGE AREA ID | | ID OF MEMORY AREA IN WHICH DATA BODY IS STORED |
| CONTROL INFORMATION | | DATA USED TO CONTROL RELAY |
| | SEQUENCE DEFINITION ID | ID OF SEQUENCE DEFINITION |
| | NEXT SEQUENCE No. | NEXT SEQUENCE DEFINITION No. TO BE EXECUTED |
| | SEQUENCE ASSOCIATION ID | ID FOR ASSOCIATING SOCKETS BETWEEN PROTOCOL TERMINATION AND PROTOCOL CONVERSION |

FIG. 11

3132 — DISTRIBUTION RULE (UPSTREAM)

| TRANSMISSION SOURCE ID | DESTINATION ID | DATA TYPE | DISTRIBUTION DESTINATION |
|---|---|---|---|
| DEVICE #1 | SERVER #1 | REGISTRATION | APL#1 |
| DEVICE #1 | SERVER #1 | POWER | APL#2 |
| DEVICE #2 | SERVER #2 | REGISTRATION | OUTSIDE |
| DEVICE #2 | SERVER #2 | POWER | OUTSIDE |
| ... | ... | ... | ... |

FIG. 12

| TRANSMISSION SOURCE ID | DESTINATION ID | DISTRIBUTION RULE (DOWNSTREAM) DATA TYPE | DISTRIBUTION DESTINATION |
|---|---|---|---|
| SERVER #1 | DEVICE #1 | NOTIFICATION | APL#1 |
| SERVER #2 | DEVICE #2 | NOTIFICATION | APL#2 |
| SERVER #1 | DEVICE #1 | RDP | OUTSIDE |
| SERVER #2 | DEVICE #2 | VNC | OUTSIDE |
| ... | ... | ... | ... |

3132

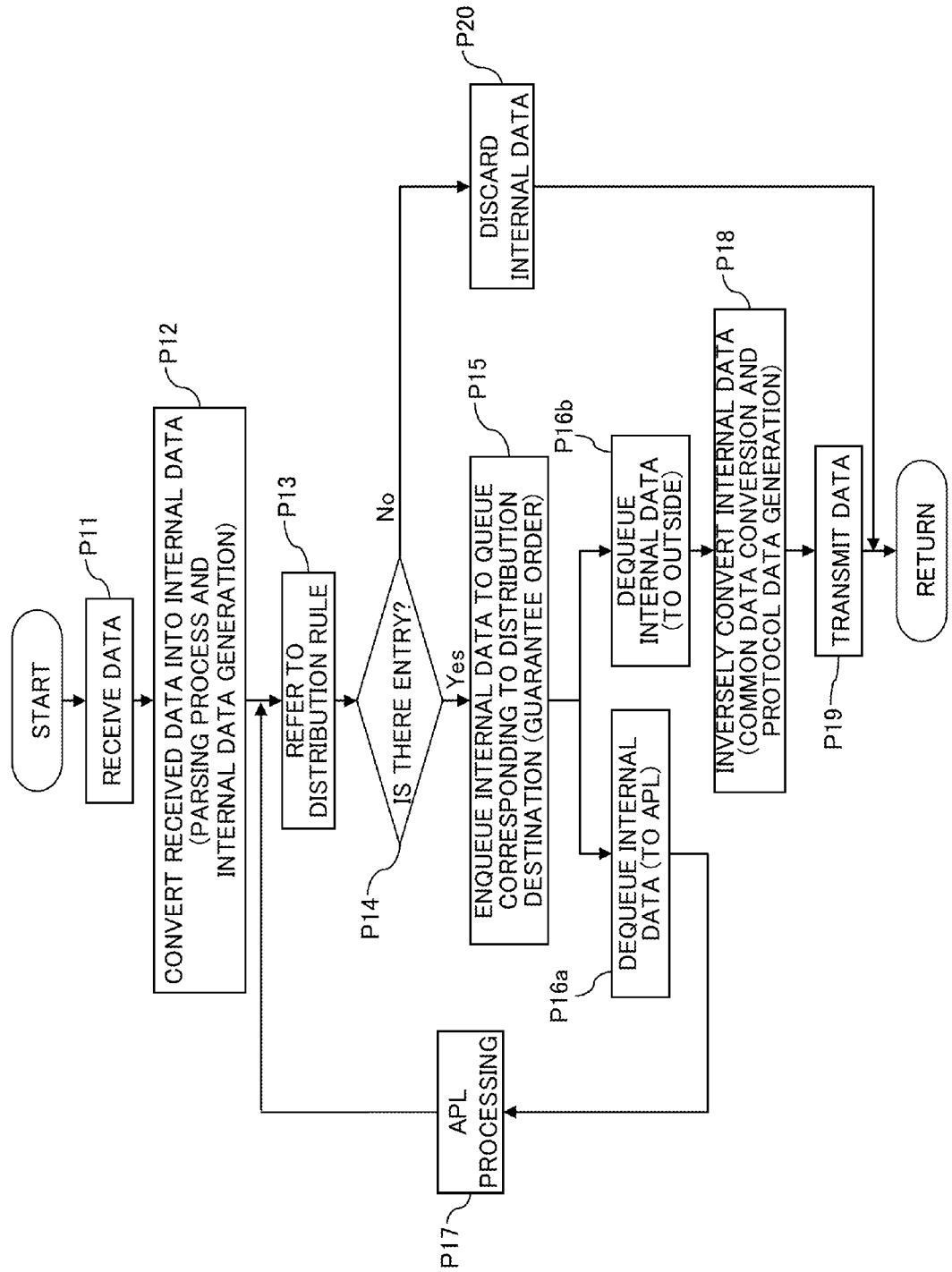

RELAY APPARATUS, RELAY CONTROL METHOD, AND RECORDING MEDIUM HAVING RELAY CONTROL PROGRAM RECORDED THEREIN

CROSS-REFERENCE TO RELATED APPLICATIONS

This application is based upon and claims the benefit of priority of the prior Japanese Patent Application No. 2013-257348, filed on Dec. 12, 2013, the entire contents of which are incorporated herein by reference.

FIELD

The embodiments discussed herein are directed to a relay apparatus, a relay control method, and a recording medium having a relay control program recorded therein.

BACKGROUND

A service gateway (SGW) is a relay apparatus which connects communication networks with different protocols. The relay apparatus connects, for example, a local area network (LAN) and a wide area network (WAN) and relays packets received from the LAN or the WAN to the network including a destination device of the packets.

The LAN is a network which is installed in, for example, a corporate office. In contrast, the WAN can be installed in an Internet environment. The relay apparatus is used to enable a device in the LAN to perform data communication through the Internet. In a corporate network, security, such as a firewall for preventing an unauthorized access from the outside, is set. The setting of the firewall makes it possible to prevent the unauthorized access from the outside.

A related technique disclosed in, for example, JP 11-225154 A has been known. In this technique, when an unauthorized access has been initiated from the WAN, a relay apparatus disconnects the communication line directed to the WAN to improve security.

However, Japanese Laid-open Patent Publication No. 11-225154 merely discloses the technique to improve security and fails to disclose, for example, a technique to relay communication based on various types of protocols.

SUMMARY

According to an aspect of the invention, a relay apparatus includes a reception processor configured to: receive data corresponding to any one of plural types of communication protocols from a first network; analyze the structure of the received data; and convert information commonly included in the data of the communication protocol into common data of a predetermined format; a transmission processor configured to transmit data corresponding to any one of the plural types of communication protocols to a second network; and a relay controller configured to control the communication protocol and destination of the received data to be transmitted from the transmission processor to the second network, based on the common data and a relay rule, the relay rule being defined for the common data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating information included in common data depicted in FIG. 6;

FIG. 11 is a diagram illustrating an example of a relay rule (upstream side) used by the relay processor depicted in FIG. 10;

FIG. 12 is a diagram illustrating an example of a relay rule (downstream side) used by the relay processor depicted in FIG. 10; and FIG. 13 is a flowchart illustrating the operation of the relay apparatus in the communication system according to the embodiment.

DESCRIPTION OF EMBODIMENT(S)

Figure 1:
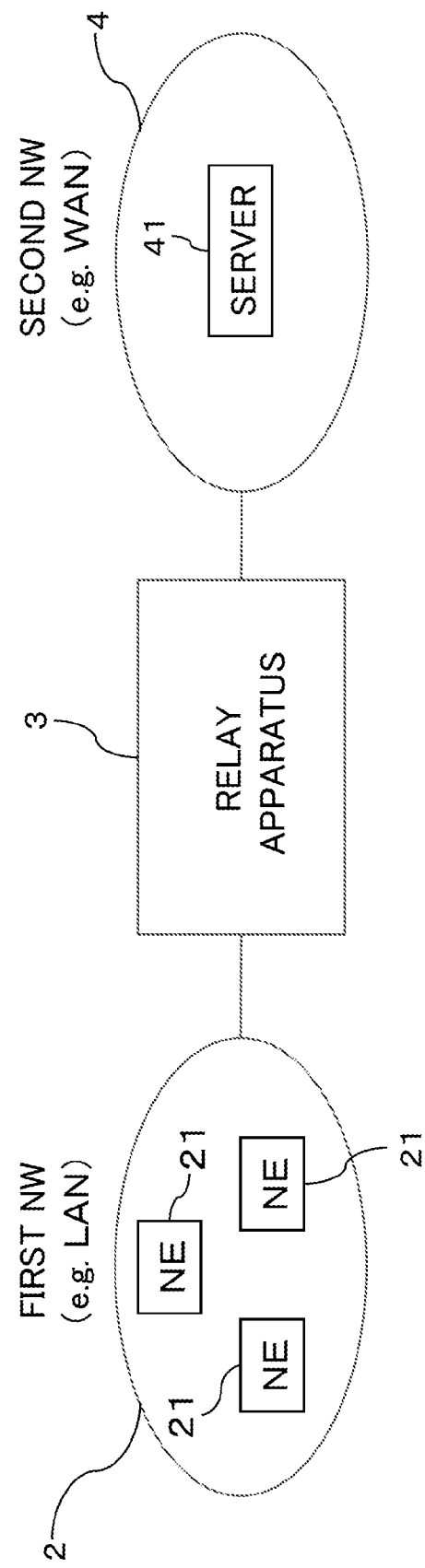
FIG. 1 is a diagram illustrating the structure of a communication system according to an embodiment.

FIG. 1 is a diagram illustrating a structure of a communication system 1 according to an embodiment. For example, the communication system 1 depicted in FIG. 1 includes a first network (NW) 2, a second NW 4, and a relay apparatus 3 which relays communication between the first and second NWs 2 and 4.

An example of the first NW 2 is a LAN and an example of the second NW 4 is a WAN. The LAN 2 includes, for example, a plurality of network elements (NEs) 21. An example of the NE 21 is a device with a communication function. An example of the device is a sensor. Therefore, in this embodiment, the LAN 2 may be referred to as a sensor network.

An example of the sensor 21 is a physical amount sensor which senses various kinds of physical amounts, such as a current, a voltage, power, temperature, pressure, a flow rate, a speed, acceleration, an angular velocity, mass, and the amount of light. Some sensors 21 are available to compositively sense any one of the physical amounts. In recent years, there are some intelligent sensors 21 with an information processing function or a communication function. In some cases, the sensor (device) 21 is referred to as a "smart sensor (device)".

A server 41 included in the WAN 4 is, for example, a computer (information processing device), such as a cloud server provided in a cloud center. In the WAN 4 depicted in FIG. 1, only one server 41 is provided. However, a plurality of servers 41 may be provided.

The sensor 21 is available to transmit the sensed information (hereinafter, may be referred to as "sensor information") to the server 41 by using the communication function. In addition, the sensor 21 is available to receive control information transmitted from the server 41 to the sensor 21 by using the communication function and to perform an operation corresponding to the received information. In other words, the server 41 is available to remotely perform maintenance, operation, and management processes, such as a process of updating a firmware of the sensor 21 and a process of confirming, changing, and resetting the settings of the user device 21.

In some cases, communication between devices, such as communication between the server 41 and the sensor 21, may be referred to as machine-to-machine (M2M) communication. In the field of the M2M communication, there are various types of sensors 21. The range of devices to which the M2M communication can be applied has been extended according to the improvement of an information system, such as a reduction in the size of the communication device and the development of wireless communication technology.

When a standard communication protocol is used for the communication between the server 41 and various types of sensors 21, it is unnecessary to prepare individual (dedicated) communication devices or programs (software or applications) for the communication between the server 41 and various types of sensors 21. However, in the M2M communication, in practice, there are various types of communication protocols supported by the sensors 21.

For example, the sensors 21 may include: a sensor which is available to perform communication by using general-purpose communication protocols based on an Internet protocol (IP), such as TCP, UDP, FTP, and HTTP; and a sensor which is available to perform communication by using a unique communication protocol based on the IP. The unique communication protocol is, for example, a protocol which is uniquely defined by an operator side or a manager side for the sensor 21. In addition, some sensors 21 may be available to perform communication by using communication protocols different from the IP. For example, some sensors 21 may be available to perform wireless communication and some sensors 21 may be available to perform communication by using a serial communication protocol, such as RS232C or USB. Furthermore, some sensors 21 may be available to perform communication by using, for example, an SCP, an ECHO-NET Lite (registered trademark), and a CWMP.

The SCP is an abbreviation of Secure Copy Protocol. ECHONET Lite is a communication protocol defined by the ECHONET Consortium and is a control protocol directed for a smart house and a sensor network protocol.

The CWMP is a communication protocol defined by the Broadband Forum and is an abbreviation of CPE WAN Management Protocol. The CPE is an abbreviation of Customer Premises Equipment and corresponds to a user device such as the sensor 21. The technical specifications of the CWMP are described in TR-69 (Technical Report 069).

As such, it is an actual condition that there are various types of communication protocols supported by the sensor 21. Meanwhile, in recent years, with the development of cloud computing, for example, it is studied that a cloud (for example, the server 41) collects sensor information of various types of sensors 21 and utilizes the collected information as "big data."

However, in the actual condition of the above-mentioned M2M communication, it would be necessary to prepare dedicated communication devices for the respective sensors 21 which support different communication protocols each other in order to enable the server 41 to collect the sensor information of various types of sensors 21. In addition, the dedicated communication device may need to process or convert the sensor information into an information format which is easy for the server 41 to process. Furthermore, it would be necessary to prepare dedicated software or applications in order to support various types of sensors 21. Therefore, in the actual condition, the cost of introducing the M2M communication to the cloud center would increase and it would be difficult to introduce the M2M communication.

In this embodiment, the relay apparatus 3 absorbs the difference between various types of communication protocols supported by various types of sensors 21 such that the sensors 21 and the server 41 perform communication therebetween, without regard to the communication protocol therebetween. Such relay apparatus 3 will be described in detail as set out below. The relay apparatus 3 may be referred to as a service gateway (SGW).

Figure 2:
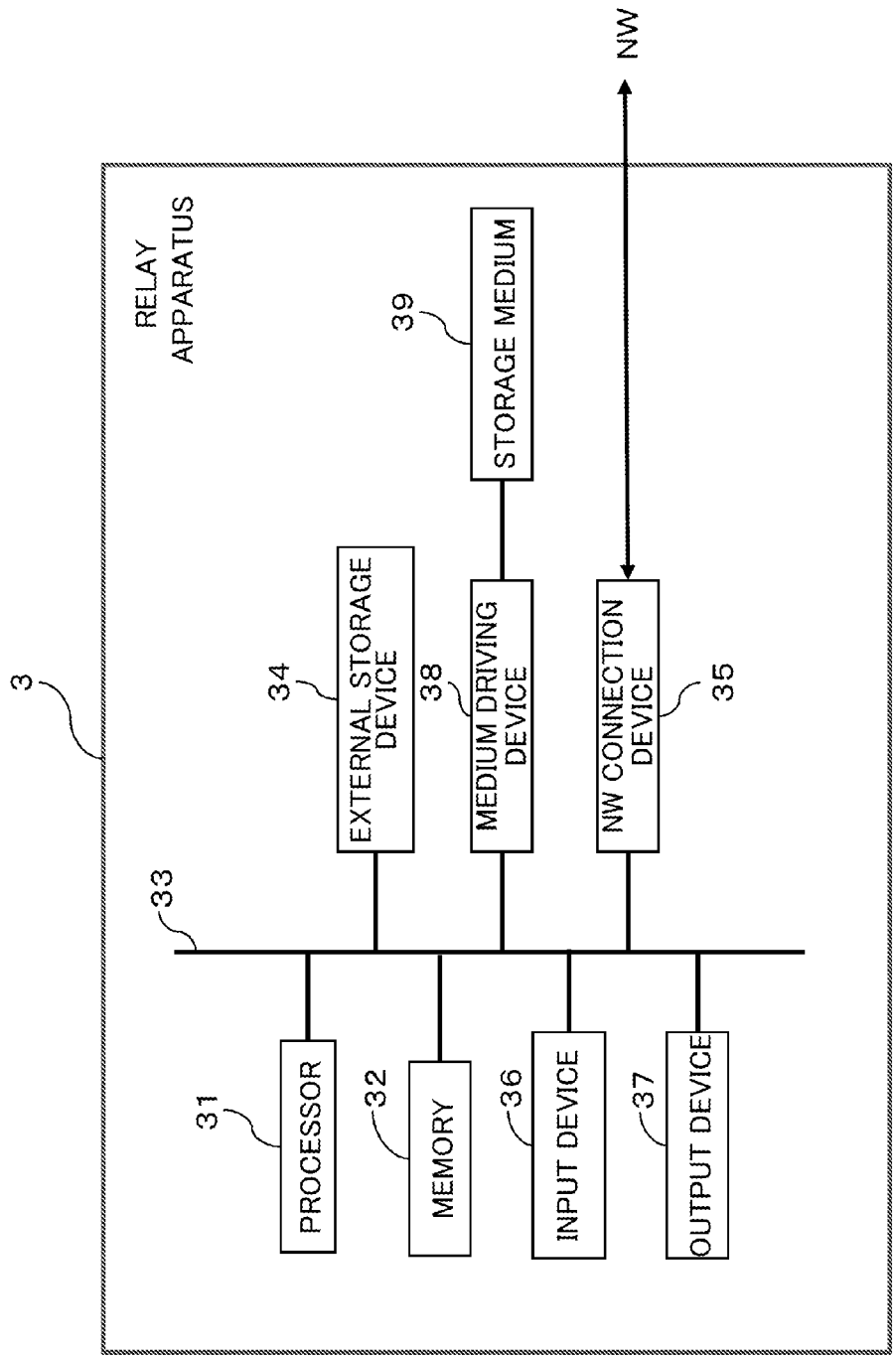
FIG. 2 is a block diagram illustrating an example of a hardware configuration of a relay apparatus depicted in FIG. 1.

FIG. 2 is a block diagram illustrating an example of a hardware configuration of the relay apparatus 3 according to this embodiment. The relay apparatus 3 depicted in FIG. 2 includes, for example, a processor 31, a memory 32, a bus 33, an external storage device 34, and a network (NW) connection device 35. As an option, the relay apparatus 3 may include any one or more of an input device 36, an output device 37, and a medium driving device 38. The relay apparatus 3 may be implemented by, for example, an information processing device such as a computer.

The processor 31, the memory 32, the external storage device 34, and the network connection device 35 are connected by the bus 33 so as to communicate with each other. When any one or more of the input device 36, the output device 37, and the medium driving device 38 is provided in the relay apparatus 3, it may be connected to the bus 33.

The processor 31 is, for example, a processing circuit or a processing unit with arithmetic capacity, such as a central processor (CPU). The processor 31 reads a program or data stored in the memory 32 or the external storage device 34 and executes the program or data to implement the operation (function) of the relay apparatus 3 depicted in FIG. 3, which will be described below. The program for implementing the operation (function) of the relay apparatus 3 may be referred to as a relay control program.

The memory 32 is, for example, a RAM or a ROM and stores the program or data. The data may include data that is used by the processor 31 to perform a process or data which is the processing result of the processor 31.

The external storage device 34 is, for example, a hard disk drive (HDD) and stores the program or data. The program or data stored in the external storage device 34 is appropriately expanded in the memory 32 in response to, for example, an instruction from the processor 31 and is used for a process by the processor 31.

The NW connection device 35 provides connection to, for example, the LAN 2 and the WAN 4 depicted in FIG. 1 and enables communication with the LAN 2 and communication with the WAN 4.

The input device 36 is, for example, a keyboard, a mouse, or a touch panel and the output device 37 is a display device (for example, a display or a touch panel) or a printing device.

The medium driving device 38 is available to output the data stored in the memory 32 or the external storage device 34 to the storage medium 39. In addition, the medium driving device 38 is available to read, for example, a program or data from the storage medium 39 and output the program or data to the external storage device 34 or the memory 32. Therefore, the program or data which implements the functions of the relay apparatus 3 can be installed from the storage medium 39. The storage medium 39 is an arbitrary storage medium, such as a flexible disk, a magneto-optical (MO) disk, a compact disc recordable (CD-R), or a digital versatile disk recordable (DVD-R). In addition, the program or data which implements the functions of the relay apparatus 3 may be downloaded from a server to the relay apparatus 3 through the NW connection device 35 by communication and then installed.

Figure 3:
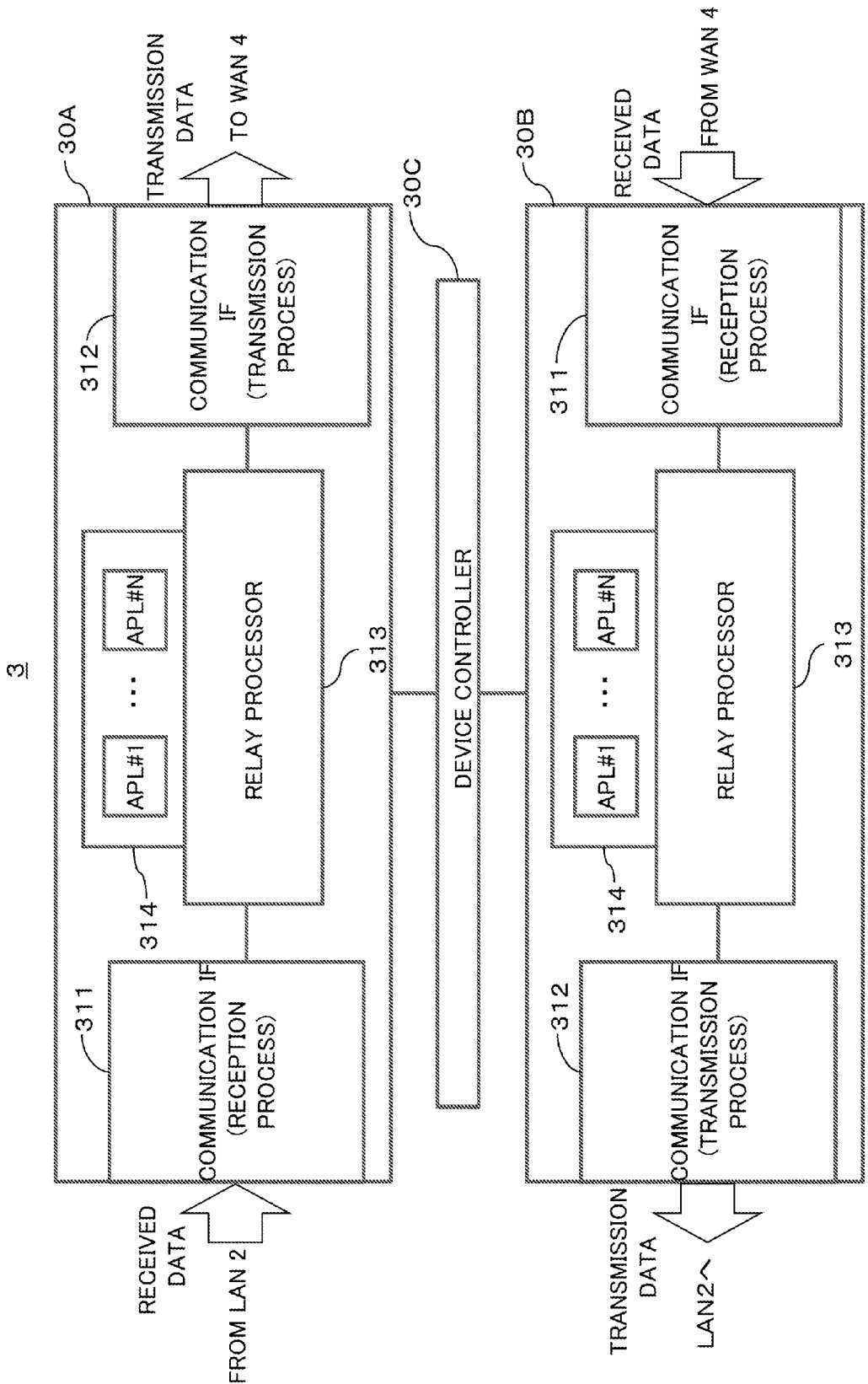
FIG. 3 is a diagram illustrating an example of a structure of the relay apparatus depicted in FIG. 1, with focusing on a functional structure of the relay apparatus.

Next, FIG. 3 illustrates an example of a functional structure of the relay apparatus 3. The relay apparatus 3 depicted in FIG. 3 includes, for example, communication processors 30A and 30B and a device controller 30C.

The communication processor 30A performs, for example, a communication process for a communication direction from the LAN 2 to the WAN 4 (hereinafter, may be referred to as an "upstream" direction).

The communication processor 30B performs, for example, a communication process for a communication direction (from the WAN 4 to the LAN 2) (hereinafter, may be referred to as a "downstream" direction) opposite to the communication direction processed in the communication processor 30A.

The device controller 30C controls the communication processes of the communication processors 30A and 30B.

The communication processor 30A (30B) includes, for example, communication interfaces (IFs) 311 and 312, a relay processor 313, and an application processor 314. The relay processor 313 may be referred to as a relay controller 313.

The communication IF 311 performs a process (reception process) on data received from the LAN 2 (or the WAN 4). In other words, the communication IF 311 is an example of a reception processor. The data received from the LAN 2 may include, for example, sensor information directed to the server 41. The data received from the WAN 4 (server 41) may include, for example, control information directed to the sensor 21. The reception process may include a process of converting the received data into internal data with a format which is independent on a communication protocol(s) (hereinafter, may be simply referred to as a "protocol") and transmitting the internal data to the relay processor 313, as discussed later.

The communication IF 312 performs a process (transmission process) of transmitting the data received by the reception processor 311 and processed by the relay processor 313 to the WAN 4 (or the LAN 2). In other words, the communication IF 312 is an example of a transmission processor. The data transmitted to the WAN 4 may include, for example, sensor information transmitted from the LAN 2 to the received server 41. The data transmitted to the LAN 2 may include, for example, control information transmitted from the WAN 4 (server 41) to the sensor 21. The transmission process may include a process of: converting the data converted into internal data by the reception processor 311 into data of a format corresponding to the communication protocol to the original destination; and transmitting the converted data to the original destination. The original destination means a destination identified by destination information included in the data received by the reception processor 311 and corresponds to, for example, the server 41 or the sensor 21.

The communication IFs 311 and 312 directed to the LAN 2 support plural types of protocols available to establish a logical communication path (for example, connection) with the sensor 21 which is an example of the NE in the LAN 2. The communication IFs 311 and 312 directed to the WAN 4 support plural types of protocols available to establish a logical communication path (for example, connection) with the server 41 which is an example of the NE in the WAN 4. The plural types of protocols may include any one of the aforementioned protocols.

The relay apparatus 3 communicates with the NE 21 in the LAN 2 which is a closed network and also communicates with the NE41 in the WAN 4 which is a closed network. In other words, the relay apparatus 3 independently communicates with the LAN 2 and communication with the WAN 4 to thereby separate the communications in the LAN 2 and the WAN 4 and ensure the security for each of the communications easily.

For example, the relay processor 313 transmits (in other words, distributes) the internal data received from the reception processor 311 to any one of the transmission processor 312 and the application processor 314 according to a predetermined relay rule. The relay rule may be referred to as a distribution rule. The rule may also be referred to as definition or policy. The relay processor 313 may be referred to as a distribution processor or a transfer processor. The internal data distributed to the application processor 314 may be processed by the application processor 314 and may be transferred to the transmission processor 312.

The application processor 314 may include one or a plurality of applications (APLs) #1 to #K (where K is an integer equal to or greater than 1). The application #i (i represents any one of 1 to K) performs a process corresponding to the object or purpose of the application #i on the data received from the relay processor 313.

For example, the application #i may include an application available to convert or process data into a predetermined format or an application available to remove unnecessary information from data or add information to the data as appropriate. For example, the application #i is available to convert or process the sensor information to be transmitted to the server 41 into a format which is easy for the server 41 to process or is available to remove information which is not required by the server 41 from the sensor information. Similarly, the application #i is available to convert or process the control information directed to the sensor 21 into a format.

The reception processor 311, the transmission processor 312, the relay processor 313, and the application processor 314 may asynchronously perform the processes each other. In FIG. 3, in the communication processor 30A directed to an upstream communication and the communication processor 30B directed to a downstream, the number of applications #i included in the respective application processors 314 is the same for descriptive purposes but may be different each other. The number of applications #i may be appropriately increased or decreased according to requests of an administrator of the sensor 21 or the server 41.

Figure 4:
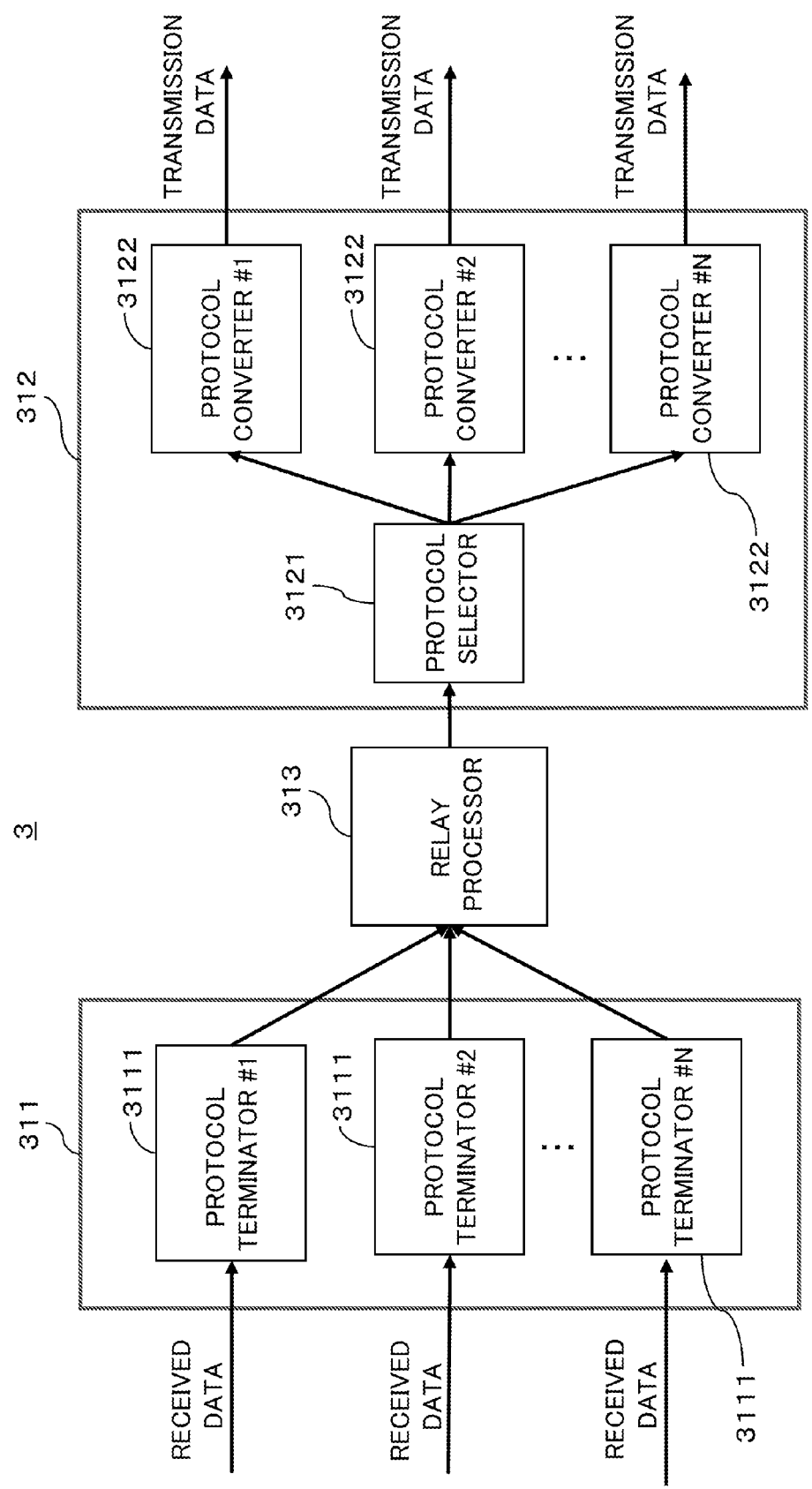
FIG. 4 is a functional block diagram illustrating an example of a structure of the relay apparatus, with focusing on a communication IF (a reception processor and a transmission processor) depicted in FIG. 3.

FIG. 4 illustrates an example of a structure of the relay apparatus 3 with focusing on the communication IF (reception processor) 311 and the communication IF (transmission processor) 312 depicted in FIG. 3.

As depicted in FIG. 4, the reception processor 311 includes, for example, protocol terminators (#1 to #N) 3111 corresponding to N protocol types (N is an integer equal to or greater than 2).

The transmission processor 312 includes, for example, a protocol selector 3121 and N protocol converters (#1 to #N) 3122 corresponding to N protocol types. For descriptive purposes, the protocol terminator #j (i represents any one of 1 to N) and the protocol converter #j support the same protocol. In other words, a pair of the protocol terminator #j and the protocol converter #j is provided for each of the protocols in the relay apparatus 3.

(Protocol Terminator)

Figure 5:
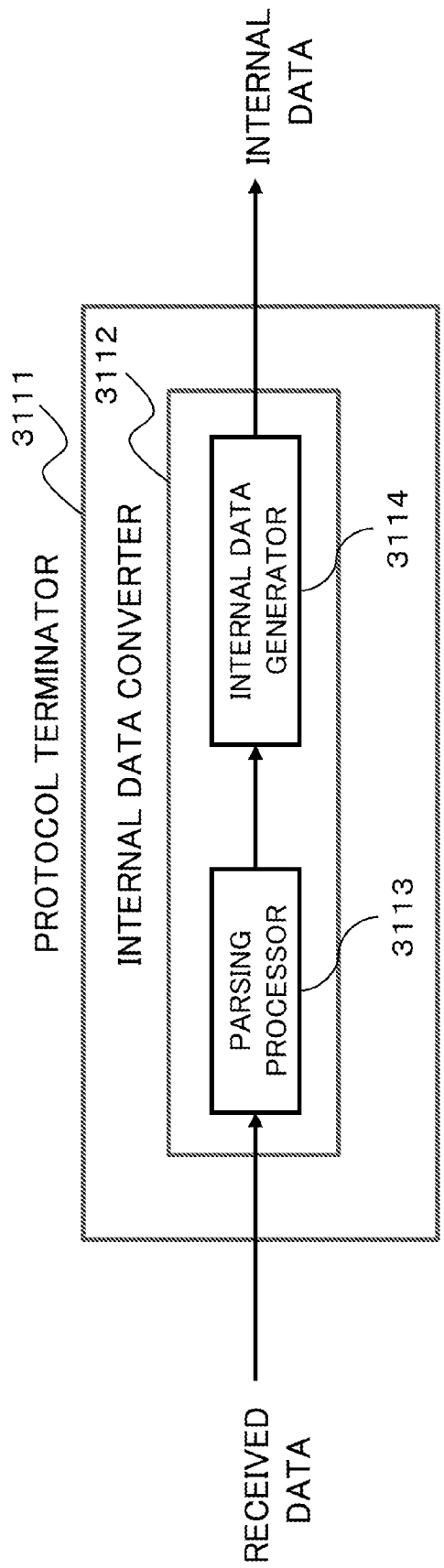
FIG. 5 is a functional block diagram illustrating an example of a structure of a protocol terminator depicted in FIG. 4.

In the reception processor 311, each of the protocol terminators 3111 includes, for example, an internal data converter 3112, as depicted in FIG. 5.

The internal data converter 3112 converts the received data into data (hereinafter, may be referred to as "internal data") with a predetermined format which is available to be commonly processed by the relay processor 313 for each of the protocols.

Therefore, the internal data converter 3112 includes, for example, a parsing processor 3113 and an internal data generator 3114.

The parsing processor 3113 is an example of an analysis processor which is available to: analyze (parse) a structure of the received data; identify the destination information or transmission source information of the received data, a data type, a protocol type, and a data body; and extract the identified information. The data body may be referred to as payload data.

Figure 6:
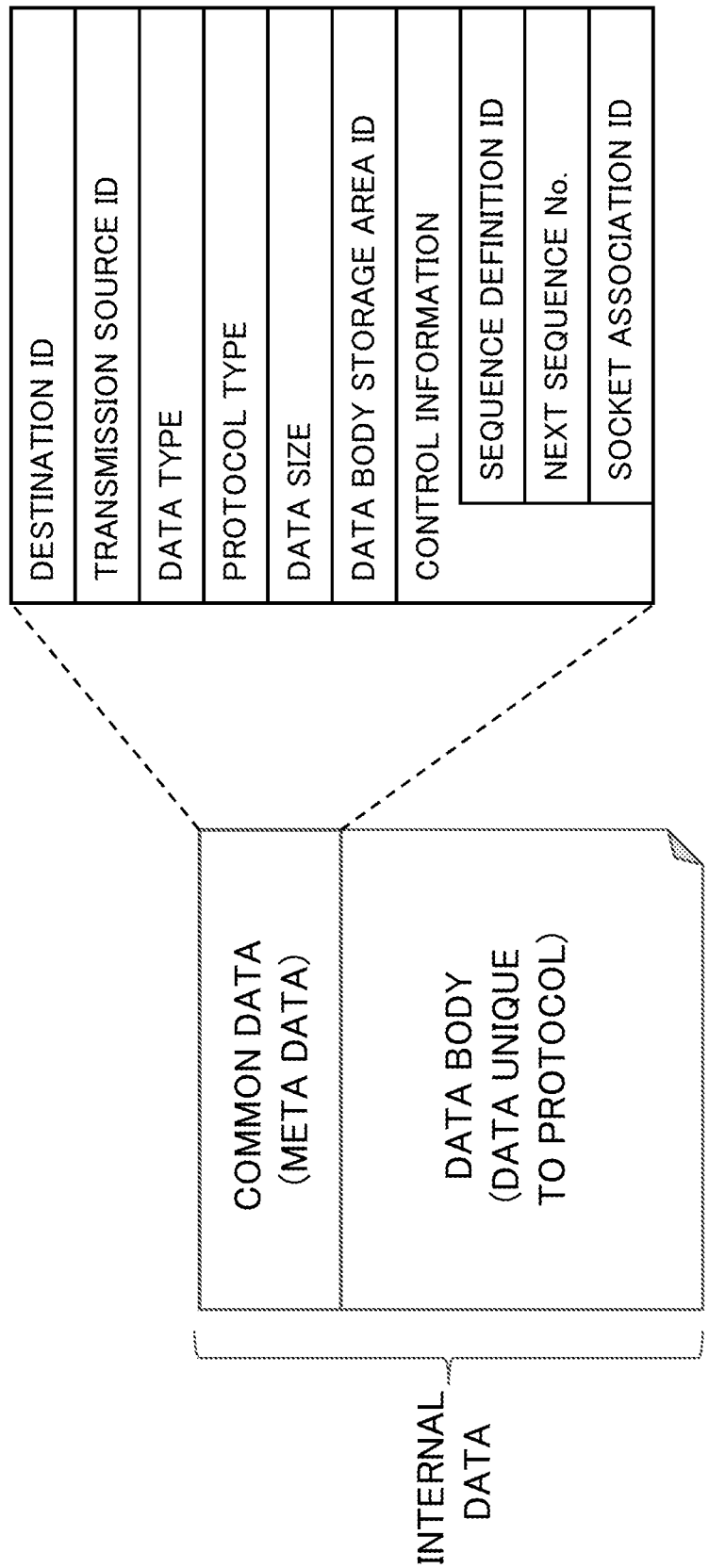
FIG. 6 is a diagram illustrating an example of a format of internal data which is obtained by an internal data converter depicted in FIG. 5.

The internal data generator 3114 is an example of a conversion processor and is available to generate, based on the information extracted by the parsing processor 3113, internal data including common data (hereinafter, may be referred to as "meta data") and a data body, as depicted in FIG. 6. As depicted in FIG. 6 and FIG. 7, the common data may include a destination ID, a transmission source ID, a data type, a protocol type, a data size, a data body storage area ID, and control information. The common data may be added to the data body which is data individual for (or unique to) the protocol.

The "destination ID" means internal identification information obtained by converting the destination information extracted by the parsing processor 3113 into information which is uniquely identifiable for the relay processor 313. For example, information obtained by converting (which may be referred to as abstracting) destination information (for example, an IP address) into a character string, a numerical sequence, or a combination of characters and numbers may be used as the destination ID.

The "transmission source ID" is information obtained by converting the transmission source information extracted by the parsing processor 3113 into internal identification information which is uniquely identifiable for the relay processor 313. For example, information obtained by converting (or abstracting) the transmission source information (for example, the IP address) into a character string or numerical sequence may be used as the transmission source ID.

The memory 32 may store data indicating the correspondence relationships between the "destination ID" and the pre-converted (original) destination information and between the "transmission source ID" and the pre-converted (original) transmission source information in, for example, a table format (see FIG. 2). The destination information and the transmission source information are an example of information which is commonly included in data of each protocol. Therefore, the internal data generator 3114 may be referred to as a converter available to convert the information commonly included in the data of each protocol into internal identification information uniquely identifiable for the relay processor 313.

The "data type" means information indicating the type (or kind) of data body. A non-limiting example of the data type indicates a device registration or an operation log from the sensor 21. For example, when the data type indicates the "device registration", the data body indicates a request to register a device, such as the sensor 21, to the server 41. When the data type indicates the "operation log", the data body indicates the operation log data of the device. Another example of the data type indicates a data type related to an OAM process including any one or more of an operation, administration, and maintenance for the sensor 21 from the server 41. The OAM process may include a process of updating firmware, a process of confirming settings, a process of changing the settings, and a process of resetting the settings.

The "protocol type" means information indicating the protocol type which is identified (extracted) by the parsing processor 3113. The information of the "protocol type" may indicate any one of various types of protocols, such as the aforementioned the FTP or the HTTP. The protocol selector 3121 of the transmission processor 312 can transfer the internal data received from the relay processor 313 to the corresponding protocol converter 3122 with reference to the "protocol type."

The "data size" means information indicating the size of the data body.

The "data body storage area ID" means information identifying the storage area of the data body. The storage area of the data body may be in the memory 32 or the external storage device 34. Therefore, the data body storage area ID may be, for example, information for identifying the address of the memory 32 or the external storage device 34 storing the data body.

The "control information" means, for example, information used to control the relay process by the relay processor 313. In other words, the "control information" is an example of information for appropriately connecting the reception processor 311, the transmission processor 312, and the application processor 314 through the relay processor 313 within the relay apparatus 3. Non-limiting examples of the "control information" are a sequence definition ID, the next sequence number, and a socket association ID.

The "sequence definition ID" means an ID for defining (identifying) a relay process order in the relay processor 313. The "sequence definition ID" may be number information which is incremented by a reception of data. The "next sequence number" means information indicating the "sequence definition ID (No.)" of the next internal data to be processed in the relay processor 313. By using the IDs above, it is possible to control the processing order of the internal data in the relay processor 313. Therefore, the reception order of data can be guaranteed and thereby the transmission order of data to the same destination can also be guaranteed.

The "socket association ID" means an ID for associating sockets between the protocol terminator 3111 (reception processor) and the protocol converter 3122 (transmission processor). The socket is indicated by, for example, a set (network address) of an IP address and a port number which is allocated to each of the protocol terminator 3111 and the protocol converter 3122 according to the protocol.

The socket may be allocated by the device controller 30C (see FIG. 3). The device controller 30C is available to control the communication IFs 311 and 312 to thereby establish a logical communication path between the sensor 21 in the LAN 2 or the server 41 in the WAN 4. An example of the communication path is a logical connection of the TCP/IP. The connection means a path through which data is transmitted in a "session" which indicates a unit from the start to the end of communication.

The session is managed by, for example, the device controller 30C. With the start of communication, the device controller 30C opens the sockets of the corresponding communications IF 311 and 312 and manages the correspondence relationship between the opened sockets in a session management. The correspondence relationship between the sockets is notified to the internal data converter 3112 and thereby the internal data generator 3114 can set the "socket association ID" to the "control information".

The protocol converter 3122 of the transmission processor 312 is available to identify a socket corresponding to the socket (in other words, the protocol) of the protocol terminator #j with reference to the "socket association ID". Therefore, a receiver-side socket and a transmitter-side socket which are identified by the socket association ID are appropriately connected to each other in the relay apparatus 3. In other words, a logical communication path is appropriately established between the reception processor 311 and the transmission processor 312 through the relay processor 313 within the relay apparatus 3.

In the protocol terminator 3111, since the received data is converted into the internal data as depicted in FIGS. 6 and 7, the difference between the protocols can be absorbed. Therefore, for example, by installing the communication IF 311 with the protocol terminators 3111 corresponding to some of commonly-used protocols to the relay apparatus 3 beforehand, a dedicated system using a embedded legacy server system is not needed. Further, since the protocol terminator 3111 may be implemented by a program or an application, it is possible to respond to an increase or decrease in the number of protocols to be supported easily by adding or removing the protocol terminator 3111.

Figure 10:
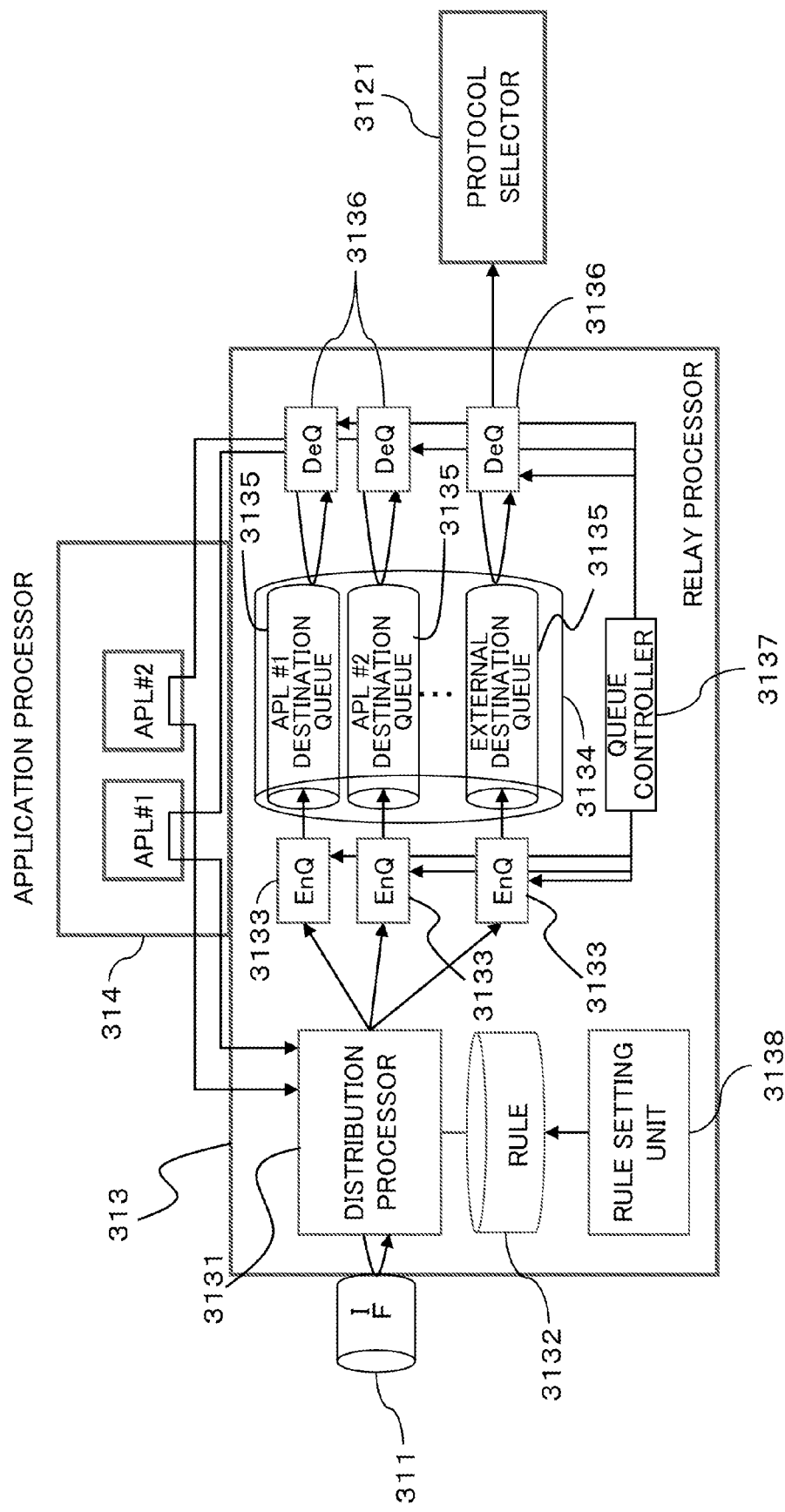
FIG. 10 is a functional block diagram illustrating an example of a structure of a relay processor depicted in FIG. 4.

The internal data is stored in a queue 3134 implemented in, for example, the memory 32 and is subject to an internal process, as discussed in later with reference to FIG. 10. In other words, the relay apparatus 3 stores information which is defined by data of various protocols or various applications in the memory 32 while giving meaning to the information.

Still another word, the relay apparatus 3 stores the received data of various types of protocols as information which can be uniformly processed by internal processing in the memory 32. Therefore, it is possible to define the process of the protocol selector 3121 or the protocol converter 3122 with data (for example, a table) indicating the correspondence relationship with the common data. As a result, it is not necessary to create a program for each protocol or each destination to which the communication IF (transmission processor) 312 is connected and thereby versatility is improved.

Further, since the transmission source information is processed (converted) into the internal information, such as a transmission source ID, it is possible to respond to a device ID which is used in a serial communication protocol, such as RS232C or USB, in addition to, for example, the network address of Ethernet (registered trademark).

(Protocol Selector)

Figure 8:
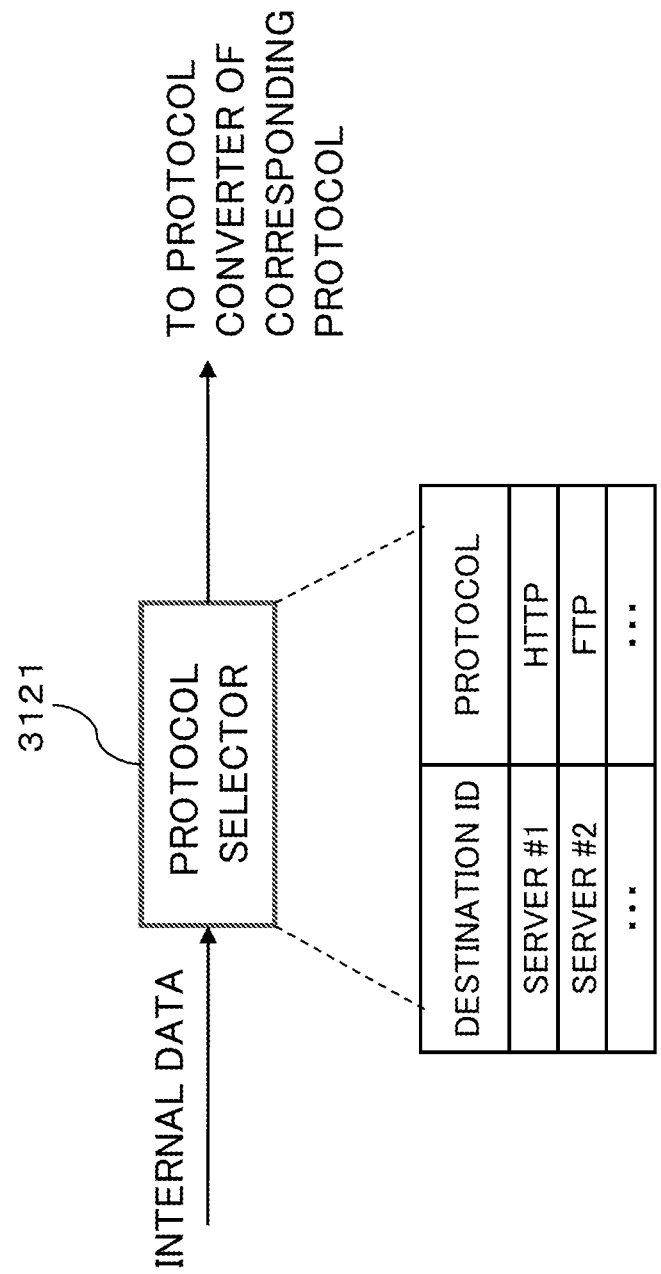
FIG. 8 is a diagram illustrating an example of data indicating a correspondence relationship between a destination ID and a protocol, which relationship is used by a protocol selector depicted in FIG. 4.

The protocol selector 3121 of the transmission processor 312 depicted in FIG. 4 transfers the internal data received from the relay processor 313 to any one of the protocol converters 3122 based on the destination ID included in the common data. For example, as depicted in FIG. 8, the protocol selector 3121 stores data indicating the correspondence relationship between the protocol and the destination ID included in the common data of the internal data, selects a protocol corresponding to the destination ID, and transfers the internal data to the protocol converter 3122 corresponding to the protocol.

(Protocol Converter)

Figure 9:
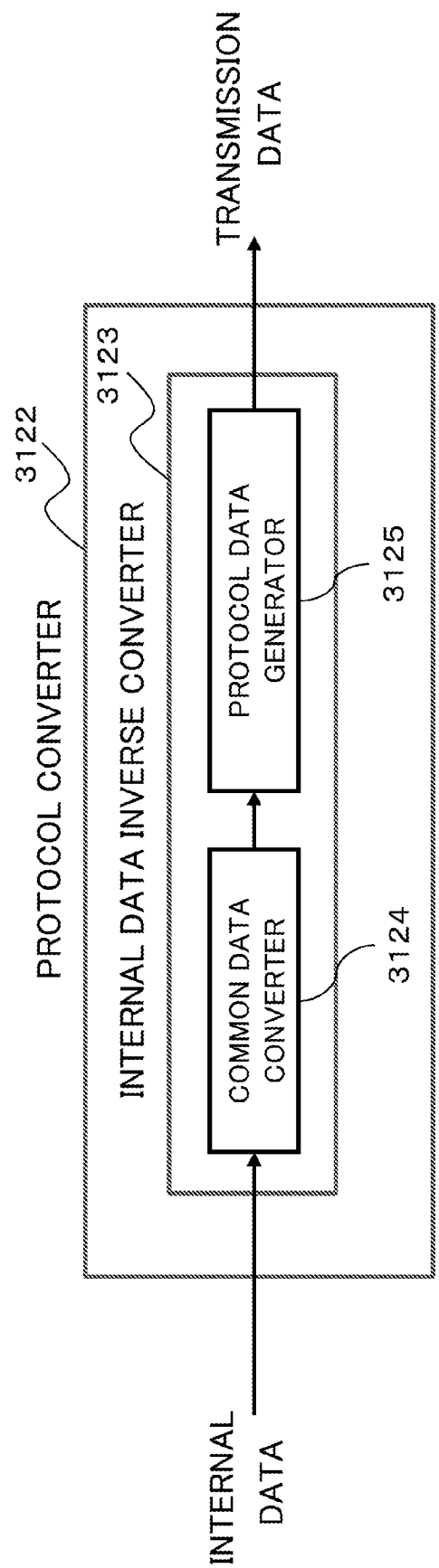
FIG. 9 is a functional block diagram illustrating an example of a structure of a protocol converter depicted in FIG. 4.

Each of the protocol converters 3122 in the transmission processor 312 includes, for example, an internal data inverse converter 3123, as depicted in FIG. 9.

The internal data inverse converter 3123 converts the internal data received from the relay processor 313 into data with the original format before being converted by the internal data converter 3112 of the reception processor 311. Therefore, the internal data inverse converter 3123 includes, for example, a common data converter 3124 and a protocol data generator 3125, as depicted in FIG. 9.

The common data converter 3124 is an example of an inverse conversion processor and is available to convert, for example, the common data included in the internal data into data corresponding to the protocol. For example, the common data converter 3124 inversely converts the "destination ID" and the "transmission source ID" in the common data into the original destination information and the original transmission source information, respectively. The inverse conversion is performed with reference to the data (for example, a table), which is stored in the memory 32, indicating the correspondence relationships between the "destination ID" and the pre-converted destination information and between the "transmission source ID" and the pre-converted transmission source information, as described above.

In addition to the original destination information and transmission source information converted by the common data converter 3124, the protocol data generator 3125 adds, for example, the data type, the protocol type, and the data size to the data body to generate data corresponding to the protocol. The generated data is transmitted to the WAN 4 when the transmission direction is the upstream direction and is transmitted to the LAN 2 when the transmission direction is the downstream direction.

Since the protocol converter 3122 may be implemented by a program or an application, it is possible to easily respond to an increase or decrease in the number of protocols to be supported by adding or removing the protocol converter 3122.

(Relay Processor)

Next, the relay processor 313 will be described in detail with reference to FIG. 10. As depicted in FIG. 10, the relay processor 313 includes, for example, a distribution processor 3131, a distribution rule 3132, a plurality of enqueues (EnQs) 3133, a queue 3134, a plurality of dequeues (DeQs) 3136, a queue controller 3137, and a rule setting unit 3138.

The distribution processor 3131 distributes the internal data received from the communication IF 311 to any one of the enqueues 3133 according to the distribution rule 3132. The distribution rule 3132 is stored in, for example, the memory 32 (see FIG. 2).

An example of the distribution rule 3132 is illustrated in FIG. 11 and FIG. 12. FIG. 11 illustrates an example of an upstream distribution rule 3132 and FIG. 12 illustrates a downstream distribution rule 3132.

In FIG. 11, a first entry indicates that internal data in which the transmission source ID, the destination ID, and the data type included in the common data indicate "device #1", "server #1", and "registration", respectively, is distributed to APL #1. Similarly, the distribution destination of the internal data is indicated in the other entries.

In FIG. 12, a first entry indicates that internal data in which the transmission source ID, the destination ID, and the data type included in the common data indicate "server #1", "device #1", and "notification", respectively, is distributed to APL #1. Similarly, the distribution destination of the internal data is indicated in the other entries. In the "data type" of the third and fourth entries depicted in FIG. 12, RDP is an abbreviation of a "Remote Desktop Protocol" and VNC is an abbreviation of a "Virtual Network Computing."

The distribution processor 3131 compares the entry in the distribution table 3132 and the common data in the internal data to determine the distribution destination (for example, any one of the applications #i and the outside) of the received internal data. The "outside" means the WAN 4 or the LAN 2. Subsequently, the distribution processor 3131 transmits the internal data to the enqueue 3133 corresponding to the determined distribution destination. The distribution processor 3131 may discard the internal data which is not matched with the entry of the distribution table 3122.

The enqueue 3133 is provided for each internal destination and is available to store (or enqueue) the internal data received from the distribution processor 3131 in the queue 3134.

The queue 3134 includes a destination queue 3135 for each internal destination (distribution destination) and is available to hold the internal data in the corresponding destination queue 3135 for each distribution destination. The queue 3134 (destination queue 3135) is implemented in, for example, the memory 32 (see FIG. 2).

The dequeue 3136 is, for example, provided for each distribution destination (destination queue 3135) of the internal data and is available to extract (dequeue) the internal data held in the corresponding destination queue 3135. The internal data dequeued by the dequeue 3136 from the destination queue 3135 corresponding to the application #i is transferred to the corresponding application #i of the application processor 314. Meanwhile, the internal data dequeued by the dequeue 3136 from the destination queue 3135 corresponding to the external destination is transferred to the protocol selector 3121 of the transmission processor 312.

The internal data processed by the application #i is transferred to the distribution processor 3131. The application #i may update the destination ID of the internal data (common data).

For example, when the processed internal data is transferred to another application #i, the source application #i may update the destination ID to another application #i. Therefore, the internal data to be processed by a plurality of applications #i is transferred in a plurality of times from the distribution processor 3131 to the application processor 314 through the queue 3134 and is processed by the plurality of applications #i.

For the internal data which has been completely processed by the application #i, the destination ID of the common data is updated to the "outside" and the internal data having the updated destination ID is transferred to the protocol selector 3121 of the transmission processor 312. Therefore, it is possible to prevent the infinite loop of the internal data in the relay processor 313. The internal data dequeued from the queue 3134 may be processed by the communication between the applications #i.

As such, since the relay processor 313 includes the destination queue 3135 for each application #i, it is possible to designate the application #i which processes the internal data in the unit of the destination queue 3135. In other words, by increasing or decreasing the number of destination queues 3135 in response to an increase or decrease in the number of applications #i, it is possible to flexibly respond to the increase or decrease in the number of applications #i which process the internal data.

The queue controller 3137 controls the enqueuing by the enqueue 3133 and the dequeuing by the dequeue 3136. For example, the queue controller 3137 controls the enqueue 3133 such that the reception order (and therefore the transmission order) of the internal data is guaranteed, with reference to the "sequence definition ID" and the "next sequence number" of the control information (see FIG. 6 and FIG. 7) included in the common data. The reception order may be guaranteed by controlling the dequeue 3135.

The rule setting unit 3138 sets the aforementioned distribution rule 3132. For example, the rule setting unit 3138 may set the distribution rule 3132 using a configuration file given from the device controller 30C (see FIG. 3). Alternatively, the rule setting unit 3138 may communicate with an external device (for example, the server 41) through the device controller 30C to acquire the distribution rule 3132 and may set the distribution rule 3132.

Next, the operation of the relay apparatus 3 in the communication system 1 according to this embodiment will be described with reference to the flowchart depicted in FIG. 13.

With focusing on the upstream direction, the relay apparatus 3 receives data from any one of the sensors 21 included in the LAN 2 by the reception processor 311 (Process P11). The received data is input to the protocol terminator 3111 corresponding to the socket in the reception processor 311.

In the protocol terminator 3111, the internal data converter 3112 (the parsing processor 3113 and the internal data generator 3114) converts the received data into the internal data depicted in FIG. 6 and FIG. 7 (Process P12).

The internal data is transferred to the distribution processor 3131 of the relay processor 313. The distribution processor 3131 refers to the distribution rule 3132 (see FIG. 10) based on the common data included in the received internal data (Process P13) and checks whether there is an entry with the matched transmission source ID and destination ID (Process P14).

When it is checked that there is the entry in the distribution rule 3132 (Yes in Process P14), the distribution processor 3131 transmits the internal data to the enqueue 3133 corresponding to the distribution destination which is set in the entry. The enqueue 3133 stores (enqueues) the internal data received from the distribution processor 3131 in the destination queue 3135 of the corresponding distribution destination (Process P15). At that time, as described above, the reception order (and therefore the transmit order) of the internal data is guaranteed based on the "sequence definition ID" and the "next sequence number" of the control information (see FIG. 6 and FIG. 7) included in the common data.

The internal data enqueued in the destination queue 3135 corresponding to the application #i is dequeued by the corresponding dequeue 3136 and is then transferred to the corresponding application #i of the application processor 314 (Processes P16a and P17). As described above, the application #i updates the destination ID included in the common data of the processed internal data, if necessary, and transfers the internal data to the distribution processor 3131.

In contrast, the internal data enqueued in the destination queue 3135 corresponding to the external destination is dequeued by the corresponding dequeue 3136 (Process P16b) and is then transferred to the protocol selector 3121 of the transmission processor 312. The protocol selector 3121 transfers the received internal data to the corresponding protocol converter 3122 with reference to the protocol type of the common data.

In the protocol converter 3122, the internal data inverse converter 3123 converts the internal data received from the relay processor 313 into the original data with the format before being converted by the internal data converter 3112 of the reception processor 311 (Process P18).

For example, in the internal data inverse converter 3123, the common data converter 3124 inversely converts the "destination ID" and the "transmission source ID" of the common data into the original destination information and the original transmission source information, respectively. Then, in the internal data inverse converter 3123, in addition to the original destination information and the transmission source information, the protocol data generator 3125 adds, for example, a data type, a protocol type, and a data size to the data body to generate data corresponding to the protocol.

The generated data is transmitted to the destination (for example, the server 41 in the WAN 4) indicated by the destination information (Process P19). In Process P14, when the corresponding entry is not present in the distribution rule 3132 (No in Process P14), the distribution processor 3131 discards the internal data (process P20). Therefore, it is possible to prevent the internal data which is not defined in the distribution rule 3132 from being erroneously transmitted. As a result, it is easy to ensure security.

A downstream data relay process is performed by the same method as that in the upstream data relay process according to the downstream distribution rule 3132 (see FIG. 12). Since the distribution rule 3132 is separated for the downstream distribution rule and the upstream distribution rule, it is easy to ensure security for both of the downstream and upstream.

The above-mentioned process enables the relay apparatus 3 to absorb a difference in the communication protocol between the sensor 21 in the LAN 2 and the server 41 in the WAN 4 and to appropriately transmit data of various types of protocols. For example, information of various types of sensors 21 with various types of protocols can be easily collected and stored in the cloud server 41. In addition, the server 41 can access various types of sensors 21, without regard to various types of protocols of the sensors 21. Therefore, it is possible to reduce the cost of installing the M2M communication to, for example, the cloud center and lower the entry level of the installation.

According to the above-mentioned aspect, it is possible to absorb the difference between various types of protocols and to appropriately relay data.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A relay apparatus comprising:
   a reception processor configured to: receive data corresponding to any one of plural types of communication protocols from a first network; analyze a structure of the received data; and convert information commonly included in the data of the communication protocol into common data of a predetermined format;
   a transmission processor configured to transmit data corresponding to any one of the plural types of communication protocols to a second network; and
   a relay controller configured to control the communication protocol and destination of the received data to be transmitted from the transmission processor to the second network, based on the common data and a relay rule, the relay rule being defined for the common data.

2. The relay apparatus according to claim 1, wherein
   the reception processor comprises a plurality of protocol terminators corresponding to the plural types of communication protocols, and
   each of the protocol terminators comprises:
   an analysis processor configured to analyze the structure of the received data and extract transmission source information, destination information, and data body of the received data; and
   a conversion processor configured to convert the respective transmission source information and destination information into internal identification information to be included in the common data.

3. The relay apparatus according to claim 2, further comprising one or more of applications configured to process the received data, wherein
   the relay rule includes data indicating a correspondence relationship between the identification information and information indicating an internal distribution destination, the internal distribution destination including any one of the applications and the transmission processor, and
   the relay controller includes a distribution processor configured to transmit the common data and the data body to a distribution destination corresponding to the identification information based on the data indicating the correspondence relationship.

4. The relay apparatus according to claim 3, wherein
   the common data includes information indicating a processing order of the received data having the same destination information,
   the relay controller comprises:
   a queue configured to store the common data and the data body for each distribution destination; and
   a queue controller configured to control a transfer order of transferring the common data and the data body from the queue to the distribution destination, based on the information indicating the processing order of the common data.

5. The relay apparatus according to claim 3, wherein
   the relay controller discards the common data and the data body when the correspondence relationship for the respective data is unavailable in the relay rule.

6. The relay apparatus according to claim 4, wherein
   the relay controller discards the common data and the data body when the correspondence relationship for the respective data is unavailable in the relay rule.

7. The relay apparatus according to claim 2, wherein
   the transmission processor comprises:
   a plurality of protocol converters correspond to the plural types of communication protocols; and
   a protocol selector configured to select a communication protocol of the common data and the data body which are transmitted from the relay controller, based on data indicating a correspondence relationship between the identification information and the communication protocol of the received data, and to transmit the common data and the data body to a protocol converter corresponding to the selected communication protocol, and the respective protocol converter comprises:
a reverse conversion processor configured to inversely convert the identification information of the common data into the transmission source information and the destination information of the received data; and
a protocol data generator configured to generate transmission data corresponding to the selected communication protocol, the transmission data including: the transmission source information and the destination information obtained by the inverse conversion; and the data body.

8. A relay control method comprising:
receiving data corresponding to any one of plural types of communication protocols from a first network;
analyzing a structure of the received data to convert information commonly included in the data of the communication protocol into common data of a predetermined format; and
upon transmitting data corresponding to any one of the plural types of communication protocols to a second network, controlling the communication protocol and destination of the received data to be transmitted to the second network, based on the common data and a relay rule, the relay rule being defined for the common data.

9. A non-transitory computer-readable recording medium having recorded therein a relay control program that causes a computer to execute a process comprising:
receiving data corresponding to any one of plural types of communication protocols from a first network;
analyzing a structure of the received data to convert information commonly included in the data of the communication protocol into common data of a predetermined format; and
upon transmitting data corresponding to any one of the plural types of communication protocols to a second network, controlling the communication protocol and destination of the received data to be transmitted to the second network, based on the common data and a relay rule, the relay rule being defined for the common data.

* * * * *